(12) United States Patent
Wong

(10) Patent No.: US 9,503,867 B2
(45) Date of Patent: Nov. 22, 2016

(54) DUAL BUTTON PUSH TO TALK DEVICE

(71) Applicant: Northrop Grumman Systems Corporation, Falls Church, VA (US)

(72) Inventor: Calvin Gwoon Wong, Rancho Palos Verdes, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 14/824,637

(22) Filed: Aug. 12, 2015

(65) Prior Publication Data

US 2016/0050547 A1 Feb. 18, 2016

Related U.S. Application Data

(60) Provisional application No. 62/036,804, filed on Aug. 13, 2014.

(51) Int. Cl.
| | |
|---|---|
| *H04W 4/10* | (2009.01) |
| *H04M 1/60* | (2006.01) |
| *H04M 3/56* | (2006.01) |
| *H04R 1/10* | (2006.01) |
| *H04M 1/23* | (2006.01) |
| *H04M 1/253* | (2006.01) |

(52) U.S. Cl.
CPC .............. *H04W 4/10* (2013.01); *H04M 1/6058* (2013.01); *H04M 3/568* (2013.01); *H04R 1/1041* (2013.01); *H04R 1/1083* (2013.01); *H04R 1/1091* (2013.01); *H04M 1/23* (2013.01); *H04M 1/2535* (2013.01); *H04R 2201/107* (2013.01); *H04R 2420/01* (2013.01); *H04R 2420/09* (2013.01); *H04R 2499/11* (2013.01)

(58) Field of Classification Search
CPC ............................... H04M 3/568; H04W 4/10
USPC .............. 455/517, 518, 519, 520, 41.2, 509, 455/452.1
See application file for complete search history.

(56) References Cited

U.S. PATENT DOCUMENTS

| | | | |
|---|---|---|---|
| 6,987,480 B1 * | 1/2006 | Kotick .................... | H04M 9/00 342/41 |
| 2006/0045063 A1* | 3/2006 | Stanford ............... | H04W 84/16 370/345 |
| 2006/0247925 A1* | 11/2006 | Haenel .................... | G10L 15/22 704/215 |
| 2009/0298451 A1* | 12/2009 | Malaga .................... | H04B 1/40 455/129 |

* cited by examiner

*Primary Examiner* — John J Lee
(74) *Attorney, Agent, or Firm* — Andrews Kurth Kenyon LLP; Sean S. Wooden

(57) ABSTRACT

Described are dual button push to talk devices that enable a user to simultaneously monitor multiple call nets/voice conferences and selectively respond on each call net that includes a PTT controller that connects to/controls audio streams received from a radio and a voice telephony EUD, selectively routs the audio streams from the radio and the EUD to left and right earpiece outputs simultaneously and selectively routs audio received from microphone input to the radio and the EUD. The PTT receives the radio audio streams through a radio interface and microphone input audio is selectively routed to the radio through the radio interface. The PTT may also include an EUD input, wherein the EUD audio stream is received through the EUD input and a EUD microphone output, in which the audio received from the microphone input is selectively routed to the EUD microphone output.

29 Claims, 3 Drawing Sheets

| LEFT EAR CUP | RIGHT EAR CUP |
|---|---|
| USB VoIP (SLS RADIO) | USB VoIP (SLS RADIO) |
|  | SIP VOICE TELEPHONY |

FIG. 2A

| BLACK (PTT BUTTON) | RED (PTT BUTTON) |
|---|---|
| USB VoIP CALL NET (LEFT OR RIGHT) | SIP VIOCE TELEPHONY (RIGHT ONLY) |

FIG. 2B

DUAL BUTTON PUSH TO TALK DEVICE

RELATED APPLICATIONS

The present application claims the priority of U.S. Provisional Application No. 62/036,804, entitled "Dual Button Push to Talk Device," and filed Aug. 13, 2014, which is hereby incorporated by reference in its entirety.

BACKGROUND

Push-to-Talk (also known as Press-to-Transmit) devices have been used by airmen and Soldiers for headphone and radio control. Primarily, push-to-talk ("PTT") devices are designed to enable a single user to support conversations over a half-duplex connection. Some support dual channels and have dual control buttons. However, current devices do not enable a user to participate in and monitor multiple conversations simultaneously. Current PTT devices do not physically separate two audio channels so each user ear can hear a different conversation.

Current push-to-talk devices also do not allow separation of classified audio conversations and unclassified audio conversations on the same device. Because they do not separate the classified and unclassified audio conversations, such devices require security certifications and are limited in their usefulness.

SUMMARY

Embodiments of a dual button push to talk device are described herein. The dual button push to talk device overcome the problems of the art described above. These and other advantages are provided by a dual button push to talk (PTT) device that enables a user to simultaneously monitor multiple call nets/voice conferences and selectively respond on each call net/voice conference that includes a PTT controller that is capable of connecting to and controlling a plurality of audio streams received from a radio and an audio stream received from a voice telephony end user device (EUD), selectively routing the plurality of audio streams from the radio and the audio stream of the EUD to left and right earpiece outputs simultaneously and selectively routing audio received from microphone input to the radio and the EUD. The PTT includes the left and right earpiece outputs, the microphone input and a radio interface, in which the plurality of radio audio streams are received through the radio interface and audio received from the microphone input is selectively routed to the radio through the radio interface. The PTT may also include an EUD input, wherein the EUD audio stream is received through the EUD input and a EUD microphone output, in which the audio received from the microphone input is selectively routed to the EUD microphone output.

BRIEF DESCRIPTION OF THE DRAWINGS

FIGS. 2A-2B are tables illustrating features of an embodiment of a dual button push to talk device.

DETAILED DESCRIPTION

Described herein are embodiments of a dual button push to talk device. Embodiments overcome the problems described above. For example, embodiments provide an electromechanical device that interfaces headsets to radios and user devices through a cable harness. Embodiments of the dual button PTT device enable users to simultaneously monitor multiple conversations and to selectively respond to each. The dual button PTT device also gives the user control of functions such as channel selection and volume. Embodiments of the dual button PTT device are wearable by a Soldier.

Embodiments of the dual button PTT device allows a user to be engaged in two conversations and monitor a third, simultaneously. Through the use of just two buttons in embodiments, the user controls all these functions. Embodiments of the dual button PTT device allow up to three audio streams to be monitored using a stereo headset, plus control of microphone output to each audio stream, one at a time. The dual button PTT device gives the user control of headset functions such as channel selection and volume control. The dual button PTT device supports more than two simultaneous conversations with microphone association to desired audio channel through a press of a button.

Embodiments of the dual button PTT device are a first sized module with two buttons and two cable connectors that are strapped to a soldier's equipment vest. Embodiments contain electronics to convert digital signals received from a radio to analog audio, mix multiple audio signals together, and selectively route the audio to either user ear via a dual speaker headset. An analog audio microphone is similarly routed and converted to digital to be transmitted by the radio. Embodiments of the dual button PTT device include hardware, software and user interface to enable to features described herein.

Embodiments of the dual button PTT device uniquely allow classified audio conversations to be routed to one ear and unclassified audio conversations to the other ear. By not mixing and keeping physically separate the signals of the classified and unclassified conversations, embodiments of the dual button PTT device avoid the need to put the dual button PTT device and attached electronic equipment through a security certification process. Embodiments of the dual button PTT device keeps classified and unclassified conversations separated digitally using standard approved techniques. Once the digital streams are converted to analog audio, they are processed separately through electronic devices and individually routed to the separate earpieces of a headset.

Figure 1:
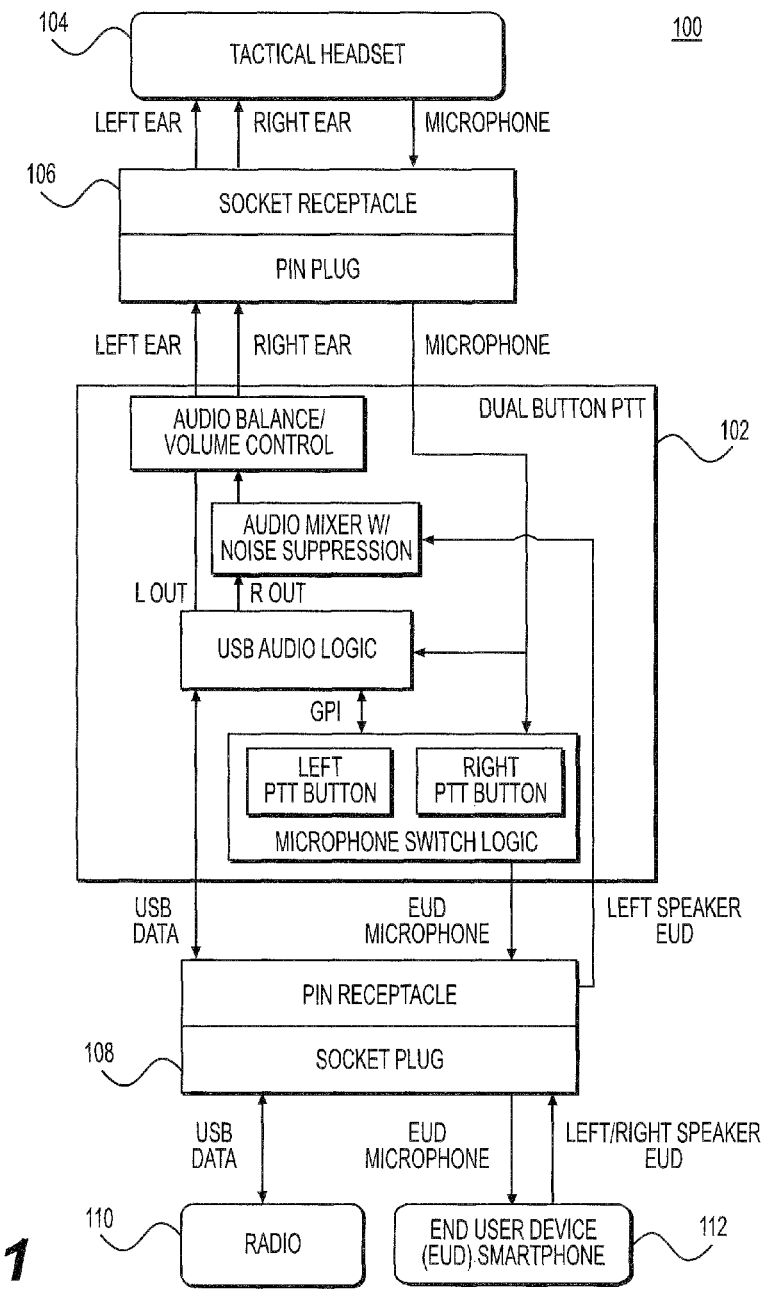
FIG. 1 is a block diagram of an embodiment of a dual button push to talk device and components thereof.

With reference now to FIG. 1, shown is functional block diagram of an embodiment of a dual button PTT device 100. As shown, embodiment of dual button PTT device 100 includes a dual button PTT controller 102 connected to tactical headset 104, radio 110 (e.g., SLS radio) and voice telephony end user device (EUD) 112 (e.g., smartphone). Dual button PTT controller 102 may be connected to tactical headset 104 via connectors 106. Connectors 106 may include or connect to cables, wires, cords, etc. that connect tactical headset 104 to connectors 106. Alternatively, connectors 106 may include Bluetooth or other wireless connections to tactical headset 104. Dual button PTT controller 102 may be connected to radio 110 and EUD 112 via connectors 108. Connectors 108 may include or connect to cables, wires, cords, etc. that connect radio 110 and EUD 112 to connectors 108. Alternatively, connectors 106 may include Bluetooth or other wireless connections to tactical headset 104. Connectors 106 and connectors 108 may include, e.g., a pin plug and socket receptacle or a pin receptacle and socket plug. Dual button PTT device 100 is an electromechanical device that interfaces to tactical headset 104, radio 110 and voice telephony end user device 112. Dual button PTT controller 102 enables the user to simultaneously monitor multiple call nets/voice conferences and enables the user to selectively respond on each call net.

Tactical headset 104 is a stereo headset that typically includes a boom microphone and two earpieces/speakers (left and right). Tactical headset 104 may be a SoldierLink System (SLS) tactical headset. Dual button PTT device 100 may be used to support tactical voice communications and voice telephony operations over a high bandwidth Mobile Ad-hoc Network (MANET). SLS establishes secure, infrastructure-less, mobile ad-hoc, high-data-rate network using Advanced Kinetic Networking Waveform (AKNW). These networks may include or carry classified conversations. SLS supports Company Level Command Posts (CPs), Commander's Vehicles and Dismounted Platoons found in Infantry Brigade Combat Teams (IBCTs). SLS makes every soldier and platform a radio node in a high-speed all-IP MANET. Each radio node offers device "plug and play" IP ports, switching and routing, provides wireless access and supports gateway services. As noted, embodiments of dual button PTT device 100 allows up to three audio streams to be monitored using tactical headset 104, plus control of microphone output to each audio stream one at a time.

With continued reference to FIG. 1, a primary function of dual button PTT controller 102 is to associate the boom microphone of tactical headset 104 to the desired call net received by the soldier or other user. As shown in FIG. 2A, which illustrates cell net assignments of tactical headset 104 in an embodiment of dual button PTT device 100, dual button PTT controller 102 enables the user to monitor up to three (3) simultaneous call nets: two (2) USB Voice-over-IP (VoIP) nets from radio 110 and one (1) voice telephony net (e.g., Session Initiated Protocol (SIP)) from the EUD 112. USB VoIP nets are assigned to the left or the right headset ear piece/cup by an application outside of the SLS PTT. In embodiments, SIP voice telephony nets are assigned to the right ear piece/cup. The audio in the right ear is mixed when there is more than one source assigned to the same ear.

With reference now to FIG. 2B, embodiments of dual button PTT device 100 may be equipped with two (2) talk buttons: e.g., black and red buttons. The microphone of tactical headset 104 may be activated by depressing the black or red talk button. In embodiments, depressing the red button activates the microphone to the right ear for SIP voice telephony response and depressing the black talk button activates the microphone to the left or right ear for USB VoIP response when there is more than one USB VoIP net being monitored. The association of the microphone to a USB VoIP call net on the left or right ear, therefore, may be user selectable.

In embodiments, the association of black and red buttons, and left and right ear pieces/cups, with first and second USB VoIP nets and voice telephony net, may be switched. E.g., voice telephony net may be associated with the left ear piece/cup and priority of first USB VoIP net may be right ear piece/cup.

Embodiments of dual button PTT device 100 enable a user to adjust audio balance and volume control through a sequence of talk button press and release events. This function enables the user to balance the audio levels between SIP analog voice and USB VoIP as well as set the overall audio (volume) level to tactical headset 104. The controls may be also be implemented through a single knob.

With continued reference to FIG. 1, embodiments of dual button PTT device 100 are designed to monitor up to three (3) call nets and enable a user to associate the microphone to these call nets from a single button push. In embodiments of dual button PTT device 100 used with SLS, there are two types of call nets: USB VoIP and SIP voice telephony.

Radio 110 may be a SLS advanced kinetic networking waveform (AKNW) radio. Embodiments of SLS AKNW radios support a native voice communication capability using a USB interface, standard VoIP software and networking protocols. USB call nets are established from the radio to all radios in the net. These nets are autonomous and require no centralized server to support voice conferencing leveraging USB plug and play connectivity. Embodiments of dual button PTT controller 102 support up to two (2) USB VoIP call nets, simultaneously, one in each ear.

In addition to USB VoIP, embodiments of dual button PTT device 100 support SIP voice telephony to integrate with programs of record (PORs) and IP telephony systems including 3G/4G/5G systems. An SIP audio application may be hosted on EUD 112. Audio-out and microphone-in signaling from EUD 112 may be processed and annunciated in the right ear by dual button PTT controller 102.

With continued reference to FIG. 1, embodiments of dual button PTT controller 102 incorporate a stereo USB audio sound chip (USB Audio Logic) that provides bit stream converters required to implement, e.g., a USB 2.0 compliant audio peripheral and multimedia audio interface. The USB audio chip logic may include an embedded microcontroller, an Analog-to-Digital Interface (ADIF) and an Asynchronous Digital-to-Analog Converter (ADAC) (not shown).

In embodiments, the USB audio logic provides the following functionality:
Supports full-speed USB 2.0 operations;
Supports USB Audio Class 1.0 operations;
Translates incoming control requests and Human Interface Device (HID) Class 1.1 events; and
Manages input signaling from talk buttons via programmable general purpose input/output (GPIO) pins.

Embodiments of dual button PTT controller 102 provide microphone switch logic supporting two talk buttons (left (black) PTT button and right (red) PTT button) to enable the user to assign the microphone of headset 104 to a call net. The following describes the functionality and use of the talk buttons in an embodiment:
The talk buttons provide the following:
Microphone will remain inactive until a talk button is pressed and held;
Pressing and holding a talk button assigns the microphone to a call net and activates the microphone to conduct voice communications;
Upon release of a talk button the microphone returns to inactive;
Button activation shall provide the user with a positive feedback of activation;
Buttons are sufficiently spaced on the controller to enable the user to intuitively depress either talk button independently with individual fingers or thumb;
Buttons provide sufficient surface to be operated and keyed with gloved hands, including mission oriented protective posture IV (MOPP IV) gloves;
The placement of the buttons on dual button PTT device 100 provides easy to access operations;
The red talk button will be positioned on the right side of dual button PTT device 100 when dual button PTT device 100 unit is attached on the front torso of user's outfit (e.g., front torso of improved outer tactical vest (IOTV)); and
The black talk button will be positioned on the left side of the PTT when dual button PTT device 100 unit is attached on the front torso of user's outfit (e.g., front torso of improved outer tactical vest (IOTV)).

The color of the talk buttons has no correlation to classification of the audio. Red is simply used to imply "R," "Right," or "Right ear." Black is used for the left ear.

In an embodiment, the red talk button of dual button PTT device 100 supports SIP analog voice telephony. This audio is annunciated in right ear of the headset 104. In embodiments, the red talk button shall remain operational to support SIP analog voice telephony when the SLS radio 110 is detached from the SLS cable harness.

In an embodiment, the black talk button of dual button PTT device 100 supports USB VoIP. In an embodiment, USB audio is primarily annunciated in the left ear. When there is more than one USB VoIP call net assigned to a user, the second USB VoIP call net is annunciated in the right ear.

In embodiments used with SLS, upon power-up dual button PTT device 100 is detected by the SLS radio 110 and automatically associates the black talk button for USB VoIP connectivity to the left ear independent of any previous state.

In embodiments, the specific assignment of call nets to left and right speaker of headset 104 is defined by an application outside of dual button PTT controller 102. The application monitors and sends human interface device (HID) protocol messages to the USB audio interface. Specific HID protocol messages processed by dual button PTT controller 102 may include the following:

Button press and release events for microphone un-mute and mute; and

Double button press and release (press then release x2) in quick succession to switch the current assignment of microphone for USB VoIP to the opposite ear. For example, if current microphone association is the left, a double button press and release will reassign the next talk button push to the right. The timing between button press actions may be defined by an application in the SLS radio 110.

With continued reference to FIG. 1, embodiments of dual button PTT controller 102 incorporate an audio mixer (as shown) to combine the inbound audio (USB and SIP) streams to the right ear. The audio mixer may incorporate voice detection/noise suppression logic to provide clarity in audio minimizing annunciating background noise. Embodiments of dual button PTT controller 102 provide controls for the user to balance the audio volumes (left and right) and adjust overall volume (see audio balance/volume control). The controls should be accessible on dual button PTT device 100 and should prevent accidental adjustment when in operation. The controls may be implemented through a single knob or through a combination sequence of talk button press and release events. In embodiments, the minimum volume setting for audio volume control is lower than 40 dB(A) and the maximum volume setting does not exceed 100 dB(A) at headset 104.

Figure 3:
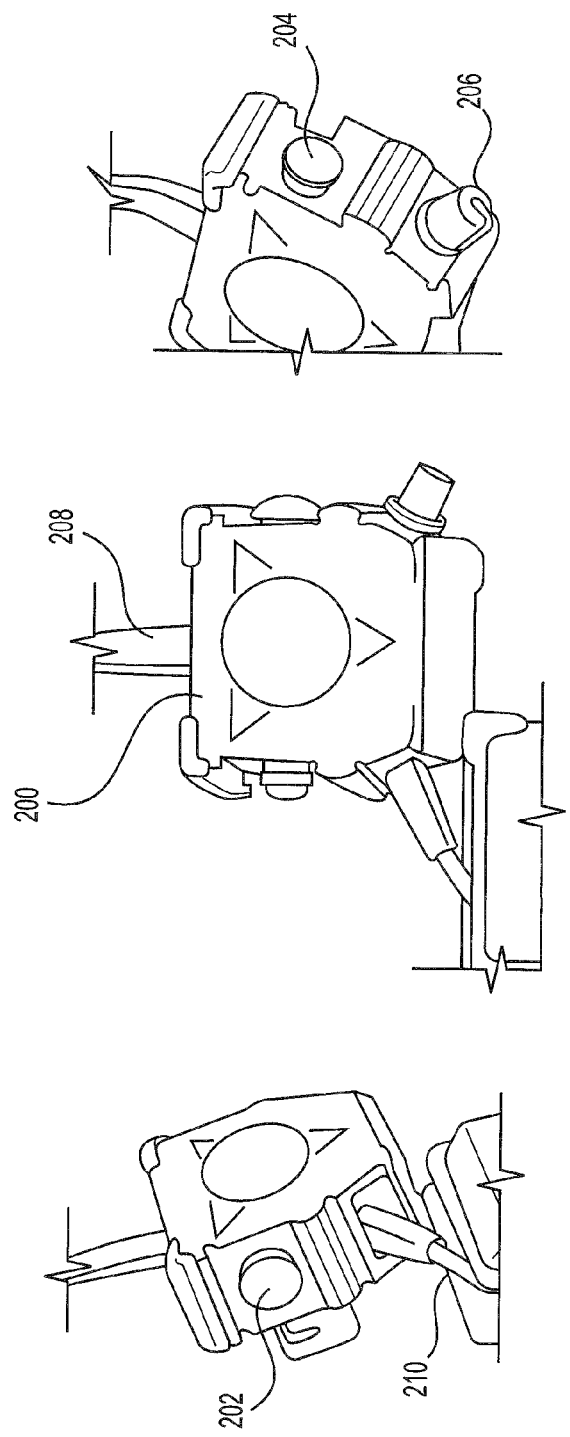
FIG. 3 includes different views of an embodiment of a dual button push to talk device.

With reference to FIG. 3, shown is an embodiment of dual button PTT device 100. Specifically shown is housing 200 containing dual button PTT controller 102. Housing 200 includes red or right button 202, black or left button 204, balance/audio level knob 206, and connectors 208, 210 to radio 110 and EUD 112 (not shown in FIG. 3). Dual button PTT device 100 may be one of several components worn by the soldier. When used with SLS, dual button PTT device 100 is one of several components worn by the soldier. Accordingly, embodiments of dual button PTT device 100 are designed to accommodate from the 5th to 95th percentile rifle squad soldier, wearing every configuration of the advanced combat uniform and equipment, including MOPP IV and environmental clothing protection levels, under all mission profiles. Size and weight of dual button PTT device 100 and its housing 200 are kept to a minimum with sufficient ruggedness for combat operations.

Dual button PTT device 100 embodiments have a slim form factor and are position-adjustable to accommodate the "shooter's preference" method of employing the ensemble for a variety of different mission profiles and soldier personal configurations. The design and implementation of embodiments of dual button PTT device 100 may use MIL-STD-882E (system safety) and MIL-STD-1472G (human engineering) as guidance. Accordingly, embodiments of dual button PTT device 100 and its housing 200, including buttons 204, 206 and knobs 208 do not exceed 2.75 in×3.50 in×1.50 in.

With continued reference to FIG. 3, embodiments of dual button PTT device 100 are designed to be interoperable with the Improved Outer Tactical Vest (IOTV). The mounting method employed may include a mechanism (e.g., a quick-release/attach clip) to easily attach to and detach from the IOTV Modular Lightweight Load-Carrying Equipment (MOLLE) webbing. The default placement of embodiments of dual button PTT device 100 is in the front torso configurable for left or right hand operations, with the exact location tailored by the user. Additional placements (e.g., attached to a waist belt) are permitted.

Embodiments of dual button PTT device 100 provide sufficient cable length from the SLS cable harness to the housing 200 and from housing 200 to the tactical headset 104. The cable length accommodates left and right hand operations, maintaining the user's ability to move, perform mission tasks and individual movement techniques freedom of movement at the head and torso areas. The weight of embodiments of dual button PTT device 100 including cabled connectors does not exceed 0.5 lbs. In embodiments, all power and grounding required to activate and operate dual button PTT device 100 are adapted from the signals available on SLS cable harness connector. Other sources of power supplies and grounding are known to those of ordinary skill in the art and may be provided.

As described herein, embodiments provide a dual button PTT device in which the dual button PTT device connects to and controls the audio streams coming from a radio that is fully compatible with the dual button PTT device through combinations of hardware and software. In embodiments, the dual button PTT device connects to and receives the audio streams coming from EUD that is fully compatible with the dual button PTT device through combinations of hardware and software, the dual button PTT device connects to and controls the actions of a microphone, which may or may not be part of a headset, and the dual button PTT device connects to and controls ear speakers (the speakers include ear cups, ear buds, bone phones, etc.) for the left ear and right ear, which may or may not be part of a headset. Embodiments enable the user to listen and/or speak on up to three simultaneous audio channels, which include USB VoIP audio streams from the radio and a SIP voice telephony audio stream from an electronic device, such as a EUD, but are not limited to these two sources. The dual button PTT device may support two USB VoIP audio streams and these audio streams are assignable to the left or the right headset ear cup by an assignment in the USB header which the dual button PTT device reads. Embodiments of the dual button PTT device support one SIP voice telephony audio stream, and SIP voice telephony audio streams are assigned to the right headset ear cup.

The association of a USB audio channel to either the right or left ear may be user selectable. In embodiments audio in the left ear is mixed when there is more than one source assigned to the same ear, and the mixer incorporates voice detection/noise suppression logic to provide clarity by minimizing background noise, and audio in the right ear is independently mixed when there is more than one source assigned to the same ear, and the mixer incorporates voice detection/noise suppression logic to provide clarity by minimizing background noise. The dual button PTT device may be equipped with two (2) talk buttons: Black and Red where Red is used to imply "R", "Right ear" and Black is used for the left ear. The red talk button on the PTT may control SIP analog voice telephony and this audio is annunciated in right ear of the headset. The black talk button may control USB VoIP and USB audio is annunciated in the left or right ear of the headset, and if there is more than one USB VoIP call net assigned to a user, the second USB VoIP call net is annunciated in the right ear. Button presses may un-mute and mute the microphone, where a double button press and release twice in quick succession switches the current assignment of microphone for USB VoIP to the opposite ear, and if the current microphone association is the Left, a double button press and release may reassign the next talk button push to the Right. The timing between button press actions may be defined by an external software application in the radio, the combination and sequence of button presses enable audio adjustments to volume and balance and reset to default is also supported. The dual button PTT device may associate a microphone to a desired audio channel received by the user from a single button push. The microphone may be activated by depressing the black or red talk button on the dual button PTT device, where depressing the red button may activate the microphone to the audio channel assigned to the right ear (e.g., SIP voice telephony response), and depressing the black talk button may activate the microphone to the audio channel assigned to the left or right ear (e.g., USB VoIP response when there is more than one USB VoIP net being monitored). The microphone may remain muted until a talk button is pressed and held, and pressing and holding a talk button may assign the microphone to an audio channel and may activate the microphone then upon release of a talk button the microphone is muted.

In embodiments, the dual button PTT device is equipped with audio balance and volume control, and this control enables the user to balance the audio levels between the two audio channels (e.g., SIP analog voice and USB VoIP) as well as set the overall audio level to the headset ear cups. The dual button PTT device may include a stereo USB audio sound chip that provides bit stream converters required to implement a USB 2.0 compliant audio peripheral and multimedia audio interface (audio stream), and the USB audio chip logic includes an embedded microcontroller, an Analog-to-Digital Interface (ADIF) and an Asynchronous Digital-to-Analog Converter (ADAC). The USB audio logic supports full-speed USB 2.0 operations, supports USB Audio Class 1.0 operations, translates incoming control requests and Human Interface Device (HID) Class 1.1 events, and manages input signaling from talk buttons via programmable General Purpose Input/Output (GPIO) pins. The specific assignment of call nets to Left and Right headset speaker is defined by an application outside of the dual button PTT device, which monitors and sends HID protocol messages to the USB audio interface. In embodiments the dual button PTT device can be detected by the radio and EUD, automatically associates the Black talk button for USB VoIP connectivity to the left ear independent of the previous state, automatically associates the Red talk button for SIP analog voice telephony connectivity to the right ear independent of the previous state, mutes the microphone, and sets the volume to default values. The dual button PTT device is interoperable with the Improved Outer Tactical Vest (IOTV), and the mounting method employed includes a mechanism to easily attach to and detach from the IOTV Modular Lightweight Load-carrying Equipment (MOLLE) webbing, and the exact location of attachment is tailorable by the user. The dual button PTT device can connect to a plurality of electronic devices, which includes but not limited to cell phones, smart phones, palm computers, small tablet computers, specialized sensors, displays, radios, transceivers, transmitter/receivers, a variety of sensors, headsets, microphones, speakers, headphones, etc.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A dual button push to talk (PTT) device that enables a user to simultaneously monitor multiple call nets/voice conferences and selectively respond on each call net/voice conference comprising:
   a PTT controller that connects to and controls a plurality of audio streams received from a radio and an audio stream received from a voice telephony end user device (EUD), selectively routing the plurality of audio streams from the radio and the audio stream of the EUD to left and right earpiece outputs simultaneously and selectively routing audio received from microphone input to the radio and the EUD, the dual button PTT device including:
      the left and the right earpiece outputs;
      the microphone input; and
      a radio interface, wherein the plurality of radio audio streams are received through the radio interface and the audio received from the microphone input is selectively routed to the radio through the radio interface.

2. The dual button PTT device of claim 1 wherein the PTT further includes:
   an EUD input, wherein the EUD audio stream is received through the EUD input; and
   a EUD microphone output, wherein the audio received from the microphone input is selectively routed to the EUD microphone output.

3. The dual button PTT device of claim 1 further comprising a connector for connecting the PTT controller to a radio and an EUD.

4. The dual button PTT device of claim 3 wherein the connector includes a pin receptacle and socket plug.

5. The dual button PTT device of claim 1 further comprising a connector for connecting the PTT controller to a tactical headset.

6. The dual button PTT device of claim 5 wherein the connector includes a pin receptacle and socket plug.

7. The dual button PTT device of claim 5 wherein the tactical headset includes a left ear piece and a right ear piece that receive audio streams output from the left and right earpiece outputs.

8. The dual button PTT device of claim 5 wherein the tactical headset is a SoldierLink System (SLS) tactical headset.

9. The dual button PTT device of claim 5 wherein the tactical headset includes a microphone that provides audio to the microphone input.

10. The dual button PTT device of claim 1 wherein the plurality of radio audio streams include a first audio stream and a second audio stream and the PTT controller selectively routs the first audio stream to the left ear piece output and the second audio stream to the right ear piece output.

11. The dual button PTT device of claim 10 wherein the first audio stream and second audio stream are received from a first call net and a second call net, respectively.

12. The dual button PTT device of claim 11 wherein the first call net and second call net are Mobile Ad-hoc Networks (MANETs).

13. The dual button PTT device of claim 11 wherein the PTT controller selectively routs the microphone audio to the first call net or the second call net.

14. The dual button PTT device of claim 11 wherein the PTT controller selectively routs the microphone audio to the first call net, the second call net, or the EUD.

15. The dual button PTT device of claim 1 wherein the PTT controller selectively routs the EUD audio stream to the right earpiece output.

16. The dual button PTT device of claim 1 wherein the radio interface is a USB interface and the plurality of radio audio streams are USB Voice-over-IP (VoIP) audio streams.

17. The dual button PTT device of claim 16 in which the dual button PTT device supports up to two USB VoIP audio streams, and the two USB VoIP audio streams are assignable to the left earpiece output or the right earpiece output by an assignment in the USB header which the dual button PTT device reads.

18. The dual button PTT device of claim 1 wherein EUD audio stream is a Session Initiated Protocol (SIP) voice telephony audio stream.

19. The dual button PTT device of claim 1 in which the association of the radio audio streams to either the right or left ear is user selectable.

20. The dual button PTT device of claim 1 further comprising a plurality of talk buttons, wherein the talk buttons enables a user to selectively control the output of radio and EUD audio streams and the left and right earpiece outputs.

21. The dual button PTT device of claim 20 wherein the plurality of talk buttons enable the user to selectively activate and control the microphone audio.

22. The dual button PTT device of claim 20 wherein the plurality of talk buttons include a left talk button and a right talk button.

23. The dual button PTT device of claim 1 further comprising an audio balance and volume control knob.

24. The dual button PTT device of claim 1 wherein the PTT controller further includes an audio mixer with voice detection and noise suppression logic, in which audio output to the left earpiece output or right earpiece output is mixed when there is more than one audio stream assigned to the same earpiece output, and the voice detection and noise suppression logic provides clarity by minimizing background noise.

25. The dual button PTT device of claim 1 in which the PTT controller further includes a stereo USB audio sound chip that provides bit stream converters required to implement a USB 2.0 compliant audio peripheral and multimedia audio interface (audio stream), and the USB audio chip logic includes an embedded microcontroller, an Analog-to-Digital Interface (ADIF) and an Asynchronous Digital-to-Analog Converter (ADAC).

26. The dual button PTT device of claim 25 in which the USB audio logic supports full-speed USB 2.0 operations, supports USB Audio Class 1.0 operations, translates incoming control requests and Human Interface Device (HID) Class 1.1 events, and manages input signaling from talk buttons via programmable General Purpose Input/Output (GPIO) pins.

27. The dual button PTT device of claim 1 in which the specific assignment of call nets to the left earpiece output and the right earpiece output is defined by an application outside of the dual button PTT device which monitors and sends HID protocol messages to the USB audio interface.

28. The dual button PTT device of claim 1 further comprising a black talk button and a red talk button wherein the dual button PTT device is detected by the radio and EUD, automatically associates the black talk button for USB VoIP radio connectivity to the left earpiece output independent of the previous state, automatically associates the red talk button for SIP analog voice telephony EUD connectivity to the right earpiece output independent of the previous state, mutes the microphone input, and sets a volume for the left and right earpiece outputs to default values.

29. The dual button PTT device of claim 1 in which the dual button PTT device is interoperable with the Improved Outer Tactical Vest (IOTV) and further comprise a mounting mechanism to easily attach to and detach from the IOTV Modular Lightweight Load-carrying Equipment (MOLLE) webbing.

* * * * *